Oct. 10, 1944.  W. A. HELSTEN  2,359,761
BRAKE ARRANGEMENT
Filed June 8, 1942  2 Sheets-Sheet 1

INVENTOR.
Wesley A. Helsten
BY
Atty.

Oct. 10, 1944.  W. A. HELSTEN  2,359,761
BRAKE ARRANGEMENT
Filed June 8, 1942  2 Sheets-Sheet 2

INVENTOR.
Wesley A. Helsten
BY
Atty.

Patented Oct. 10, 1944

2,359,761

UNITED STATES PATENT OFFICE 2,359,761

BRAKE ARRANGEMENT

Wesley A. Helsten, Chicago, Ill., assignor to American Steel Foundries, Chicago, Ill., a corporation of New Jersey Application June 8, 1942, Serial No. 446,167

19 Claims. (Cl. 188—33)

My invention relates to a brake arrangement for a railway car truck and particularly to a brake design of unit cylinder type as applicable to a four wheel railway car wherein the power means is mounted on the truck frame.

The general object of my invention is to devise a novel and practicable brake rigging suitable for application to a four wheel railway car truck and utilizing at one side of each wheel a brake head and brake shoe of the ordinary type which may bear against the tread surface of the wheel in usual manner and to afford at the opposite side of each wheel additional braking means which may utilize composition brake material such as "brake block" or similar brake lining material such as is commonly used on automotive equipment.

It is well known in the braking art that a better braking result may be obtained from the theoretical standpoint, in certain respects at least, if a combination of braking means is used, certain of which consist of metal to metal braking means and others of which consist of composition brake lining in engagement with a metal surface. In other words, certain desirable characteristics in a brake arrangement can be provided where both of these braking means are used in combination, whereas similar results can not be obtained when either is used by itself alone.

A different object of my invention, therefore, is to provide such a braking arrangement as will permit a combination of these two types of braking surfaces to be used in conjunction with each other.

My invention also comprehends a novel arrangement for utilizing braking surfaces at the inboard and outboard face of each wheel together with a novel means for applying braking means thereto.

Figure 1:
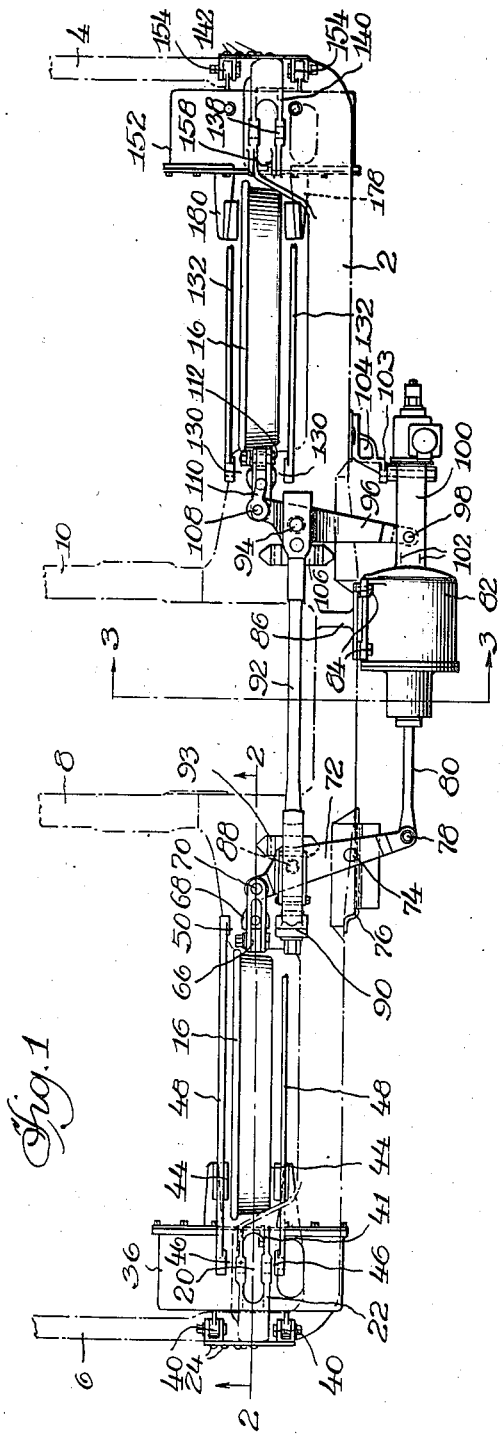
Figure 1 is a top plan view of a railway car truck and brake arrangement embodying my invention, only one-half of the truck structure being shown inasmuch as the plan is identical at opposite sides of the truck.
Figure 2:
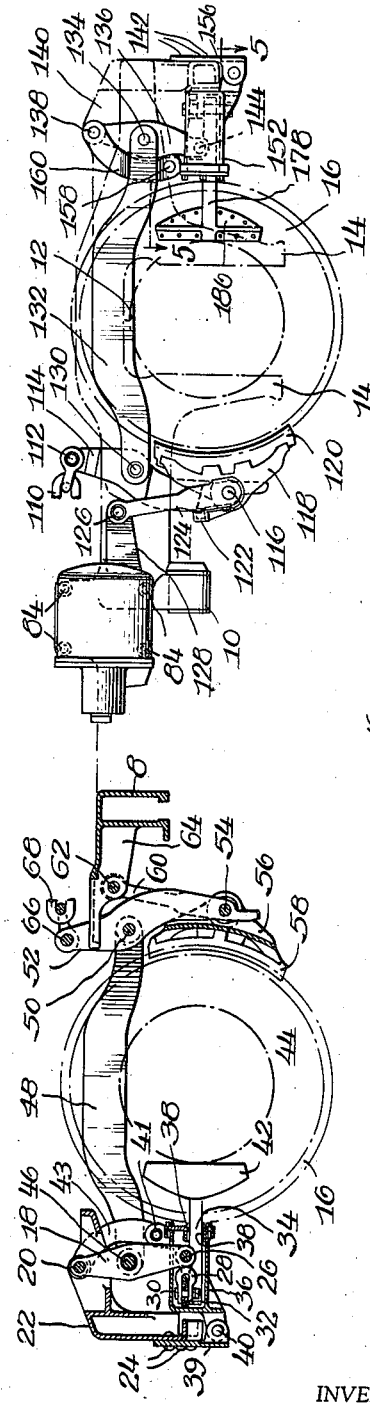
Figure 2 is a side elevation of the truck and brake arrangement shown in Figure 1, partly in section, the section being taken substantially in the longitudinal vertical plane indicated by the line 2—2 of Figure 1.

In each of the above indicated figures certain details are omitted where they may be more clearly shown in other views.

Describing in detail my novel arrangement, the truck frame structure is of known type comprising the side member 2, end rails 4 and 6, and spaced transoms 8 and 10 between which a bolster (not shown) may be supported as means of carrying a superposed car body. At each end of the side member 2 may be formed a pedestal opening 12 defined by the pedestal jaws 14, 14, said opening affording a means of connection to journal boxes (not shown) associated with wheel and axle assemblies 16, 16.

My novel brake rigging comprises a dead brake lever 18 fulcrumed as at 20 from the bracket 22 formed on the truck frame adjacent the juncture of the end rail 6 and the inturned end of the side member 2. The lower end of the dead truck lever 18 may be pivotally connected as at 26 to the clevis means 28, and the opposite end of said clevis means may have pivotal connection as at 30 to the equalizing lever 32, said equalizing lever being operatively connected to the bell crank lever 34 in manner more particularly described hereafter. The bell crank lever may be partially enclosed within the housing 36, the brake shoe supporting end of said bell crank lever extending outwardly of said housing and having slidable engagement therewith as at 38, 38. One end of the housing 36 may be afforded a two point pivotal support as at 40, 40 (Figure 1) from the bracket 39 secured to the end rail 6 as at 24, 24, and the oppostie end of said housing may have connection as at 41 to the curved arm 43, the upper end of which may also be secured at the pivot point 20. On the end of the bell crank lever 34 may be supported a brake head 42, said brake head affording support for a composition lining brake shoe which may engage the annular braking surface 44 of the adjacent wheel.

Intermediate the ends of the dead truck lever 18 may be pivotally connected as at 46 the paired inboard and outboard straps 48, 48 and the opposite ends of said straps may have pivotal connection as at 50 to a point intermediate the ends of the live truck lever 52. The lower end of the live truck lever 52 may have pivotal connection as at 54 to the brake head 56 supporting the brake shoe 58, and similarly the hanger 60 may be connected at the pivotal point 54 and be pivotally supported at its upper end as at 62 from the bracket 64 formed as an integral part of the truck frame structure.

The upper end of the live truck lever 52 may have pivotal connection as at 66 with the clevis means 68, and the opposite end of said clevis means may have pivotal connection as at 70 to the diagonally arranged live cylinder lever 72, said cylinder lever 72 being afforded slidable support as at 74 from the bracket 76, supported on the side member 2, and the outboard end of said live cylinder lever 72 extending outboard said side member for pivotal connection as at 78 to the piston rod 80 associated with the power cylinder 82 which may be supported as at 84, 84 from the bracket 86 on the side member 2.

Intermediate the ends of the live cylinder lever 72 may be pivotally connected as at 88 the slack adjuster end 90 of the pull rod 92, and slidable support may be afforded for said pull rod adjacent its connection with said live cylinder lever 72 by the bracket 93 carried on the truck frame, the opposite end of said pull rod having a pivotal and adjustable connection as at 94 to the diagonally arranged dead cylinder lever 96 whose outboard end may have pivotal and adjustable connection as at 98 to the slack adjuster 100 mounted as at 102 on one end of the cylinder 82 and supported at an intermediate point as at 103 from the bracket 104 on the side member 2.

Figure 3:
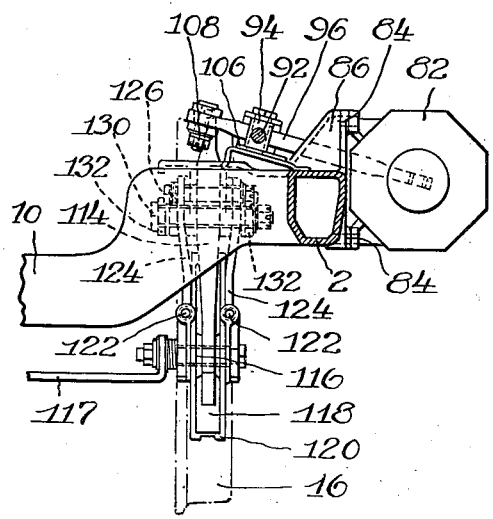
Figure 3 is a further sectional view taken approximately at the transverse vertical plane bisecting the truck, as indicated by the line 3—3 of Figure 1.
Figure 4:
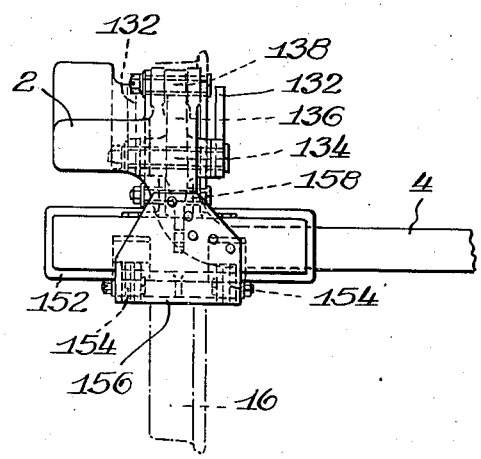
Figure 4 is an end view taken from the right as seen in Figures 1 and 2.

An intermediate slidable support may be afforded for the dead cylinder lever 96 by means of the bracket 106 (Figure 3) underlying the jaw end of the pull rod 92 adjacent its connection with said dead cylinder lever. The inboard end of the dead cylinder lever 96 may have a pivotal connection as at 108 with the clevis means 110, and the opposite end of said clevis means may have pivotal connection as at 112 to the upper end of the live truck lever 114, the lower end of which may have pivotal connection as at 116 to the brake head 118 carrying the brake shoe 120, said brake head being afforded a balancing connection 122 of well known form. Also connected at the pivotal point 116 may be the tie rod 117 (Figure 3) connecting the brake heads at opposite sides of the truck. A similar tie rod connects the brake heads associated with the other wheel and axle assembly. Also connected at the pivot point 116 may be the hanger 124, the upper end of which has pivotal support as at 126 from the bracket 128 on the frame.

Intermediate the ends of the live truck lever 114 may be pivotally connected as at 130 the paired inboard and outboard straps 132, 132, and the opposite ends of said straps may have pivotal connection as at 134 to the dead truck lever 136, the upper end of said dead truck lever being fulcrumed as at 138 from the bracket 140 formed on the end rail 4 in manner similar to that described for the opposite end of the truck.

The lower end of the dead truck lever 136 may have pivotal connection as at 144 to the clevis means 146 (Figure 5) and the opposite end of said clevis means may have pivotal connection as at 148 to the midpoint of the equalizer lever 150, said equalizer lever 150 being enclosed within the housing 152 in an arrangement identical to that at the opposite end of the truck. The end of the housing 152 adjacent the end rail 4 may have a two-point pivotal connection as at 154, 154 to the bracket 156 secured at 142, 142 to said end rail, and the opposite side of said housing may be connected as at 158 to the curved arm 160, the upper end of which may be secured to the pivot point 138 as at the opposite end of the truck.

Figure 5:
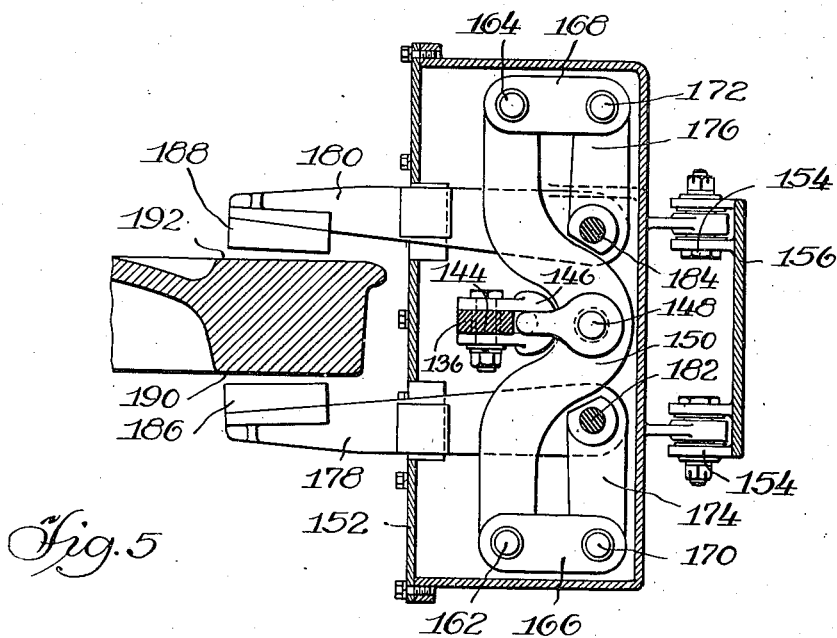
Figure 5 is an enlarged sectional view taken in the horizontal planes indicated by the line 5—5 in Figure 2.

The enlarged view of Figure 5 illustrates the bell crank arrangement which is identical for each end of the truck and may be described as follows. The equalizer lever 150 may have its opposite ends pivotally connected as at 162 and 164 to the links 166 and 168 respectively, the opposite ends of said links being pivotally connected as at 170 and 172 to the short arm ends 174 and 176 of the bell cranks 178 and 180, said bell cranks being respectively fulcrumed in said housing as at 182 and 184, and the long arms of said bell crank projecting out of the housing 152 to support brake heads 186 and 188 which in turn may support brake shoes for engagement with the annular braking surfaces 190 and 192 on the outboard and inboard faces of the adjacent wheel.

The operation of my novel brake arrangement is believed to be self-evident to those skilled in the art, but it may be noted that actuation of the power means 82 will cause the live and dead cylinder levers 72 and 96 to rotate in clockwise and counterclockwise directions about the points 88 and 94 intermediate their respective ends, thus actuating the live truck levers 52 and 114 which are connected to the inner ends of said cylinder levers. Actuation of said live truck levers will in turn, through their pull rod connections, operate the dead truck levers to which the bell crank levers are connected by means of the equalizers and links already referred to.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a truck frame comprising a side rail and end rails, spaced supporting wheel and axle assemblies, and brake rigging for each side of the truck comprising power means mounted on said side rail, live and dead cylinder levers connected at corresponding ends to opposite ends of said power means, a pull rod adjustably connecting said cylinder levers, braking means for the wheels at respective ends of the truck, and an operative connection between respective braking means and said cylinder levers, each of said braking means comprising live and dead truck levers connected intermediate their ends, said live truck lever supporting a metal brake shoe for engagement with the tread of the adjacent wheel, and said dead truck lever having operative connection with clasp brake means for the opposite side of said wheel, said clasp brake means comprising a housing supported from said frame, an equalizing lever connected at an intermediate point to said dead truck lever, dead brake levers fulcrumed from said housing and connected to opposite ends of said equalizing lever respectively, and composition lining brake shoes mounted on said brake levers for engagement with inboard and outboard faces of said wheel.

2. In a brake arrangement for a four wheel railway car truck, a truck frame, supporting wheel and axle assemblies, and brake rigging for each side of the truck comprising power means on the side of said frame, live and dead cylinder levers connected at their outboard ends to opposite ends of said power means, adjustably connected intermediate their ends to each other, and connected at their inboard ends to braking means for respective wheels, each of said braking means including a live truck lever intermediate the wheels supporting a metal brake shoe for engagement with the tread surface of the adjacent wheel, a dead truck lever outwardly of the wheel operatively connected to said live truck lever and actuating clasp brake means for engagement with inboard and outboard surfaces on said wheel, said clasp brake means comprising a housing supported on said frame, an equalizer in said housing connected to the adjacent dead truck lever, inboard and outboard bell cranks fulcrumed in said housing and connected at opposite ends to said equalizer, and composition brake material supported on said bell cranks for engagement with inboard and outboard braking surfaces on said wheel.

3. In a brake arrangement for a four wheel railway car truck, a truck frame, supporting wheel and axle assemblies, and brake rigging for each side of the truck comprising power means on the side of said frame, live and dead cylinder levers connected at their outboard ends to opposite ends of said power means, adjustably connected intermediate their ends to each other, and connected at their inboard ends to braking means for respective wheels, each of said braking means including a live truck lever intermediate the wheels supporting a metal brake shoe for engagement with the tread surface of the adjacent wheel, a dead truck lever outwardly of the wheels operatively connected to said live truck lever and actuating clasp brake means for engagement with inboard and outboard surfaces on said wheel, said clasp brake means comprising an equalizing lever connected to said dead truck lever, bell crank levers connected at opposite ends to said equalizing lever, and composition brake shoes mounted on said bell crank levers for engagement with inboard and outboard surfaces on said wheel.

4. In a brake arrangement for a railway car truck, a truck frame, supporting wheel and axle assemblies, and brake rigging for each side of the truck comprising power means mounted on said frame, interconnected live and dead cylinder levers connected at corresponding ends to said power means and at their opposite ends to braking means associated with wheels at respective ends of the truck, each of said braking means comprising a truck lever intermediate the wheels supporting a metal brake shoe for engagement with the adjacent periphery of the associated wheel, a dead truck lever at the opposite side of the wheel, pull rods connecting said brake levers, and clasp brake means at the opposite periphery of said wheel operatively connected to said dead truck lever, said clasp brake means comprising an equalizer lever connected to said dead truck lever, bell crank levers fulcrumed from said frame and connected at opposite ends to said equalizer lever and supporting composition lining brake shoes for engagement with inboard and outboard faces respectively of said wheel.

5. In a brake arrangement for a railway car truck, a truck frame comprising a side rail and end rails, spaced supporting wheel and axle assemblies, and brake rigging for each side of the truck comprising power means mounted on said side rail, live and dead cylinder levers connected at corresponding ends to opposite ends of said power means, a pull rod adjustably connecting intermediate points of said cylinder levers, braking means for the wheels at respective ends of the truck, and an operative connection between respective braking means and said cylinder levers, each of said braking means comprising live and dead truck levers connected intermediate their ends, said live truck lever supporting a metal brake shoe for engagement with the adjacent wheel, and said dead truck lever having operative connection with clasp brake means for said wheel, said clasp brake means comprising inboard and outboard composition lining brake shoes engaging said wheel.

6. In a brake arrangement for a four wheel railway car truck, a truck frame, supporting wheel and axle assemblies, and brake rigging for each side of the truck comprising power means on the side of said frame, live and dead cylinder levers connected at their outboard ends to opposite ends of said power means, adjustably connected intermediate their ends to each other, and connected at their inboard ends to braking means for respective wheels, each of said braking means including a live truck lever intermediate the wheels supporting a metal brake shoe for engagement with the tread surface of the adjacent wheel, a dead truck lever outwardly of the wheel operatively connected to said live truck lever and actuating clasp brake means for engagement with inboard and outboard faces of said wheel, said clasp brake means comprising a housing supported on said frame, an equalizer in said housing connected to the adjacent dead truck lever, and inboard and outboard bell cranks fulcrumed in said housing and connected at opposite ends to said equalizer.

7. In a brake arrangement for a railway car truck, a truck frame, supporting wheel and axle assemblies, and brake rigging for each side of the truck comprising power means mounted on said frame, interconnected live and dead cylinder levers connected at corresponding ends to said power means and at their opposite ends to braking means associated with wheels at opposite ends of the truck, each of said braking means comprising a live truck lever intermediate the wheels supporting a brake head and a metal brake shoe for engagement with the periphery of the adjacent wheel, a dead truck lever at the opposite side of the wheel, pull rods connecting said truck levers, and clasp brake means at the opposite side of said wheel operatively connected to said dead truck lever, said clasp brake means comprising inboard and outboard brake levers fulcrumed intermediate their ends from said frame and supporting composition brake shoes for engagement with inboard and outboard faces of said wheel.

8. In a brake arrangement for a railway car truck, a truck frame, supporting wheel and axle assemblies, and brake rigging for each side of the truck comprising power means mounted on said frame, adjustably interconnected live and dead cylinder levers connected at corresponding ends to said power means and at their opposite ends to braking means associated with wheels at respective ends of the truck, each of said braking means comprising a truck lever intermediate the wheels supporting a brake head and a metal brake shoe for engagement with the adjacent tread surface of the wheel, a truck lever at the opposite side of the wheel, pull rods connecting said truck levers, and clasp brake means at the opposite side of said wheel operatively connected to said dead truck lever, said clasp brake means including inboard and outboard levers supporting composition brake shoes for engagement with inboard and outboard faces of said wheel.

9. In a brake arrangement for a railway car truck, a truck frame comprising a side rail and end rails, spaced supporting wheel and axle assemblies, and brake rigging for each side of the truck comprising power means mounted on said side rail, live and dead cylinder levers connected at corresponding ends to opposite ends of said power means, a pull rod adjustably connecting intermediate points of said cylinder levers, braking means for the wheels at respective ends of the truck, and operative connections between adjacent braking means and respective cylinder levers, each of said braking means including live and dead truck levers connected intermediate their ends, said live truck lever supporting a metal brake shoe for engagement with the tread of the adjacent wheel, and said dead truck lever having operative connection with clasp brake means for inboard and outboard faces of said wheel.

10. In a brake arrangement for a four wheel railway car truck, a truck frame, supporting wheel and axle assemblies, and brake rigging for each side of the truck comprising power means on the side of said frame, live and dead cylinder levers connected at their outboard ends to opposite ends of said power means, adjustably connected intermediate their ends to each other, and connected at their inboard ends to braking means for respective wheels, each of said braking means including a live truck lever intermediate the wheel supporting a metal brake shoe for engagement with the tread surface of the adjacent wheel, a dead truck lever outwardly of the wheel operatively connected to said live truck lever, and clasp brake means for engagement with inboard and outboard faces of said wheel actuated by said dead truck lever.

11. In a brake arrangement for a four wheel railway car truck, a frame, supporting wheel and axle assemblies, each of said wheels having a tread braking surface and inboard and outboard braking faces, and brake rigging for each side of the truck comprising power means mounted on the side of said frame, live and dead cylinder levers connected at corresponding ends to opposite ends of said power means and adjustably connected to each other, and an operative connection between each cylinder lever and braking means associated with the adjacent wheel, each of said braking means comprising live and dead truck levers at opposite sides of the wheel, straps connecting said live and dead truck levers, a metal brake shoe supported from said live truck lever for engagement with said tread surface, and said dead truck lever actuating composition brake shoes for engagement with said faces.

12. In a brake arrangement for a four wheel railway car truck, a frame, supporting wheel and axle assemblies, each of said wheels having a tread braking surface and inboard and outboard braking faces, and brake rigging for each side of the truck comprising power means mounted on the side of said frame, live and dead cylinder levers connected at corresponding ends to opposite ends of said power means and adjustably connected to each other, and an operative connection between each cylinder lever and braking means associated with the adjacent wheel, said braking means comprising live and dead truck levers associated with said wheel, straps connecting said truck levers, a metal brake shoe supported from said live truck lever for engagement with said tread surface, and composition braking means actuated by said dead truck lever for engagement with said faces.

13. In a brake arrangement for a railway car truck, a truck frame, supporting wheel and axle assemblies, and brake rigging for each side of the truck comprising power means mounted on said frame, interconnected live and dead cylinder levers connected at corresponding ends to said power means and at their opposite ends to braking means associated with wheels at opposite ends of the truck, each of said braking means comprising a live truck lever intermediate the wheels supporting a brake head and a metal brake shoe for engagement with the periphery of the adjacent wheel, a dead truck lever at the opposite side of the wheel, pull rods connecting said truck levers, and clasp brake means at the opposite periphery of said wheel engaging inboard and outboard surfaces thereon and operatively connected to said dead truck lever.

14. In a brake arrangement for a railway car truck, a truck frame, supporting wheel and axle assemblies, and brake rigging for each side of the truck comprising power means mounted on said frame, adjustably interconnected live and dead cylinder levers connected at corresponding ends to said power means and at their opposite ends to braking means associated with wheels at respective ends of the truck, each of said braking means comprising a live truck lever intermediate the wheels supporting a brake head and a metal brake shoe for engagement with the tread surface of the adjacent wheel, a dead truck lever at the opposite side of the wheel, pull rods connecting said truck levers, and brake means clasping said wheel adjacent said dead truck lever and operatively connected thereto.

15. In a railway car truck, a frame, spaced supporting wheels, and brake rigging for each side of the truck comprising interconnected live and dead levers associated with each wheel, wheel tread engaging brake means operatively connected to the lower end of the live lever at one side of each wheel, and wheel clasping mechanism connected to the lower end of said dead lever at the opposite side thereof.

16. In a railway car truck, a frame, spaced supporting wheels, and brake rigging for each side of the truck comprising interconnected live and dead levers associated with each wheel, wheel tread engaging brake shoe means operatively associated with the lower end of the live lever at one side of each wheel, and wheel clasping mechanism connected to the lower end of said dead lever at the opposite side thereof, said mechanism comprising a housing pivotally hung at spaced points from said frame, an equalizer slidably mounted in said housing, and brake shoe carrying levers operatively connected to respective ends of said equalizer.

17. In a railway car truck, a frame, spaced supporting wheels, and braking means for each wheel comprising live and dead levers connected intermediate their ends, a tread engaging brake shoe operatively connected to the lower end of said live lever at one side of said wheel, and clasp mechanism operatively connected to the lower end of said dead lever at the opposite side of said wheel and including brake shoes engaging inboard and outboard faces thereof.

18. In a brake arrangement for a four wheel railway car truck, a truck frame having a side member, power means thereon, interconnected live and dead cylinder levers connected at opposite ends to said power means, and braking means for each wheel at one side of the truck connected respectively to the opposite ends of said cylinder levers, each of said braking means comprising interconnected live and dead brake levers at opposite sides of the wheel, a wheel tread engaging shoe operatively connected to said live brake lever, and clasp brake means operatively connected to said dead brake lever, said clasp brake means comprising composition shoes engaging inboard and outboard faces of said last-mentioned wheel.

19. In a brake arrangement for a wheeled railway car truck, a truck frame having a side member, power means thereon, interconnected live and dead cylinder levers connected at opposite ends to said power means, and braking means for each wheel at one side of the truck connected respectively to the opposite ends of said cylinder levers, each of said braking means comprising interconnected live and dead brake levers at opposite sides of the wheel, a wheel tread engaging shoe operatively connected to said live brake lever, and clasp brake means operatively connected to said dead brake lever.

WESLEY A. HELSTEN.